Jan. 1, 1963

E. V. SCHNEIDER 3,071,381

PHONOGRAPH TURNTABLE

Filed May 16, 1960

2 Sheets-Sheet 1

INVENTOR.
EMMOR V. SCHNEIDER
BY Woodling and Krost,
ATTORNEYS

Jan. 1, 1963 E. V. SCHNEIDER 3,071,381

PHONOGRAPH TURNTABLE

Filed May 16, 1960 2 Sheets-Sheet 2

INVENTOR.
EMMOR V. SCHNEIDER
BY Woodling and Krost,
ATTORNEYS

United States Patent Office 3,071,381

Patented Jan. 1, 1963

3,071,381

PHONOGRAPH TURNTABLE

Emmor V. Schneider, Alliance, Ohio, assignor to Consolidated Electronics Industries Corp., a corporation of Delaware Filed May 16, 1960, Ser. No. 29,414

16 Claims. (Cl. 274—39)

The invention relates in general to phonograph turntables and more particularly to that type which may readily be converted for use with records having a small center hole and records having a large center hole.

In recent years phonographs have been adapted to play records of different speeds, for example, 78, 45, 33⅓ and 16⅔ r.p.m. Records such as the 78 and 33⅓ r.p.m. playing speeds have utilized a center hole of approximately ¼ inch diameter and records of the 45 r.p.m. playing speed have utilized a center hole of about 1½ inches diameter. The turntable is adapted to be rotated at these plurality of speeds, and accordingly, turntables with a small diameter spindle must be provided with some means for centering the 45 r.p.m. records which have a larger diameter center hole. The prior art has known different types of movable center discs attached to the turntable which may be selectively an upper or a lower elevation relative to the turntable with the upper elevation being one which is high enough to engage the center hole of the 45 r.p.m. record when it is resting on the record-supporting surface of a turntable. The lower elevation of the center disc is that which permits the disc to be lowered sufficiently so that it is out of the way for the small diameter center hole records to be centered on the small diameter spindle.

Accordingly, an object of the invention is to provide an improved center disc and turntable combination in which only two parts are required to simplify the attachment of the center disc and the turntable.

Another object of the invention is to provide a center disc for a turntable wherein integral toes on the center disc engage an undersurface of the turntable to maintain the center disc retained on the turntable, yet to permit ready assembly of the two.

Another object of the invention is to provide a turntable and center disc combination wherein the center disc may be cammed into engagement with the turntable for retention therewith, yet which cannot be cammed out of mutual engagement accidentally.

Still another object of the invention is to provide a center disc and turntable assembly which is simple and economical to manufacture and assemble and which may be easily repaired or the center disc replaced if accidentally broken.

Other objects and a fuller understanding of this invention may be had by referring to the following description and claims, taken in conjunction with the accompanying drawings, in which:

Figure 1:
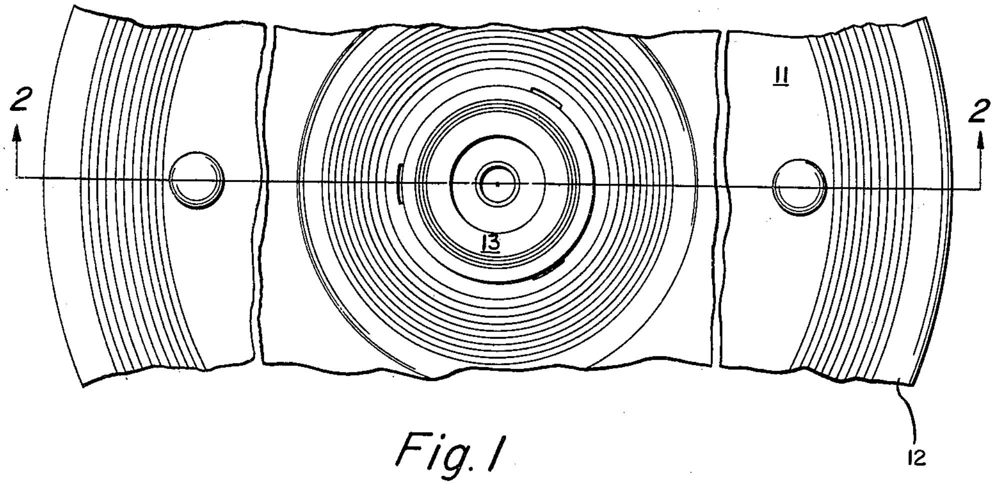
FIGURE 1 is a partial top view of the combined phonograph turntable and center disc assembly.
Figure 2:
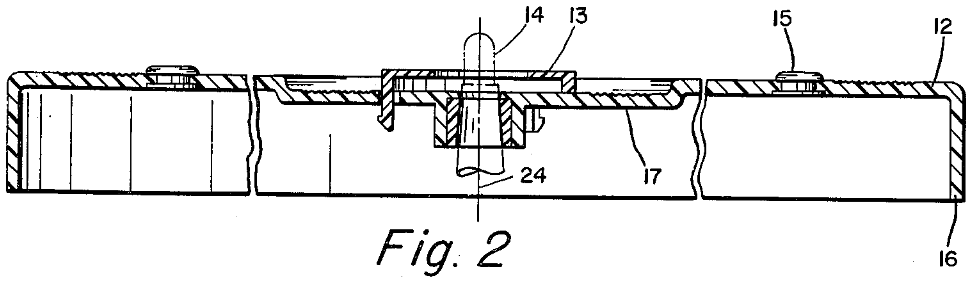
FIGURE 2 is a sectional view on line 2—2 of FIGURE 1.
Figure 3:
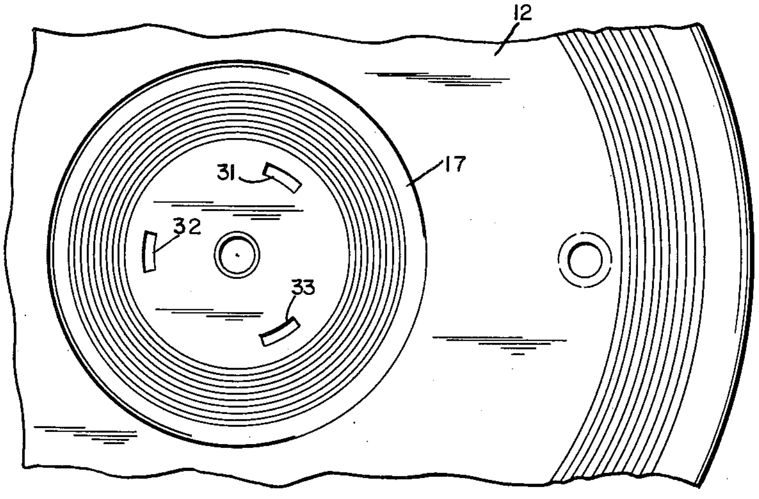
FIGURE 3 is a partial plan view of the turntable before attachment of the center disc.
Figure 4:
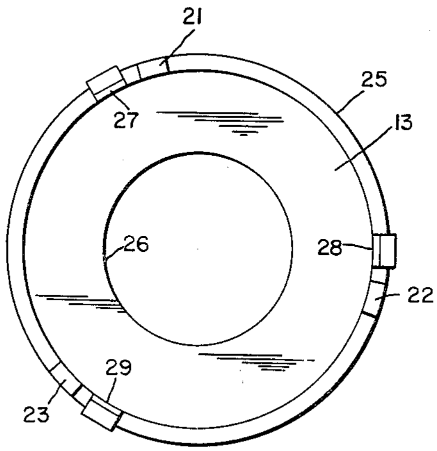
FIGURE 4 is an enlarged bottom view of the center disc.
Figure 5:
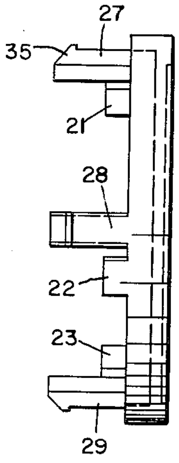
FIGURE 5 is an enlarged side view of the center disc.
Figure 6:
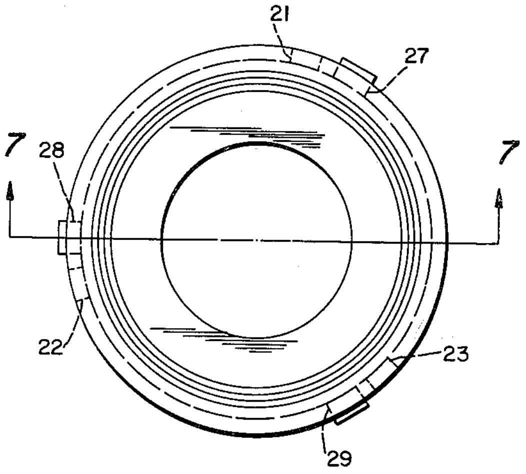
FIGURE 6 is an enlarged top view of the center disc.

The FIGURES 1 and 2 show the complete turntable assembly 11 including generally a turntable 12 and a movable center disc 13. The turntable 12 is adapted to be journalled for rotation on a small diameter spindle 14 shown in phantom in FIGURE 2. The turntable 12 has a record-supporting surface, in this case defined by rubber bumpers 15, and a downturned rim 16. The turntable 12 also has a depressed circular portion 17 to receive the center disc 13 in a lower position thereof so that it is not above the level of the record support surface 15. In this position records with a small diameter center hole may be centered on the small diameter spindle 14. The center disc 13 has an outer rim 25 flush with the outer circular diameter of the disc 13. The lower surface of this rim 25 is a first surface adapted to rest on the turntable portion 17 to establish a lower elevation of the center disc 13, so it is recessed out of the way when small center hole records are being centered by the spindle 14. The center disc 13 also has a central aperture 26 so as to avoid interference with the spindle 14.

Figure 7:
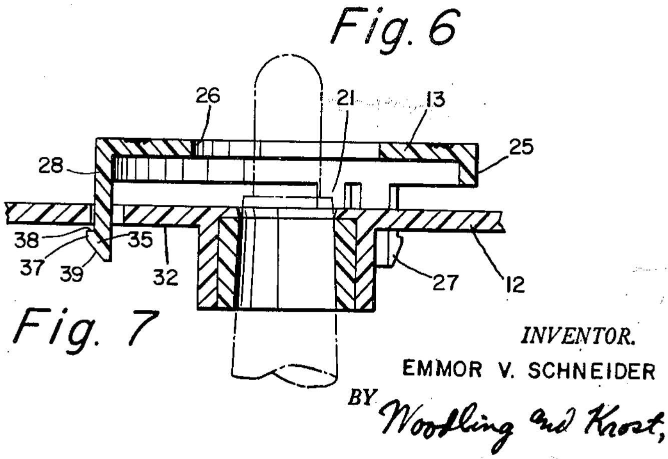
FIGURE 7 is a sectional view on line 7—7 of FIGURE 6.

The center disc 13 has stud means shown as first, second and third studs 21, 22 and 23 and the bottom of these studs provides a surface in a plane normal to the axis 24 of the turntable 12. This bottom surface of the studs is a second surface adapted to rest upon the upper surface of the turntable depressed portion 17 to establish an upper position of the center disc relative to the turntable 12. This position is as shown in FIGURE 7. The outer diameter of the disc 13 is that adapted to engage the large center hole in the 45 r.p.m. records. The studs 21–23 are flush with the outer rim 25.

Leg means extend from the center disc and are shown as three in number including first, second and third legs 27, 28 and 29. These legs depend from the disc 13 substantially perpendicularly thereto, and accordingly, extend substantially parallel to the axis 24. The turntable depressed portion 17 has slot means shown as first, second and third slots 31, 32 and 33 which extend through the turntable 12. The legs 27, 28 and 29 are adapted to be received in these slots 31, 32 and 33, respectively. The studs 21, 22 and 23 are adjacent the legs 27, 28 and 29, respectively. The slots are approximately 30° of arc, and each adjacent pair of a leg and a stud is approximately 25° of arc, to permit each pair to be received in the respective slots 31, and 33. When such is the case the center disc 13 is in the lower position, as shown in FIGURE 2.

The legs 27, 28 and 29 each has an integral foot 34, 35 and 36, respectively, on the distal end. Each foot has a toe 37 with an upper toe surface 38 and a lower cam surface 39. The toe 37 is on the longitudinal end of each foot, and accordingly, the longitudinal length of each foot is transversely of the respective slot and in this case is shown as extending radially outwardly. The width of each slot is slightly greater than the longitudinal length of each foot so as to permit insertion downwardly of each foot through each slot. The entire center disc may be made from a molded, hardened plastic material, for example, polystyrene, and the turntable 12 may also be made of the same material if desired. The legs 27–29 may thus be integral with the main portion of the center disc 13 and due to the length of the legs they have an inherent resiliency. The legs 27–29 are flush with the outer surface of the rim 25 and the toes 37 extend outwardly beyond the radial limits of the legs at the point of attachment to the rim 25. This permits use of only a two-part mold having a parting line normal to the axis 24, for economy of manufacture.

The positioning of the legs 27–29 and the outer radius of the toes 37 is such that this outer radius is greater than the radius of the outer walls of the slots 31–33. Accordingly, in the assembled position the toe surfaces 38 are adapted to engage an undersurface or latching surface of the turntable 12, in this case a surface of the turntable adjacent the respective slots. To assemble the center disc 13 and turntable 12 the center disc is merely pushed axially downwardly into the slots 31–33. The cam surfaces 39 engage the outer edge of the slots 31–33 and cam radially inwardly the legs 27–29 against the inherent resiliency of these legs. After the toe surfaces 38 have passed through the slots, the resiliency of the legs causes them to snap outwardly so that the toe surface 38 underlies the undersurface of the turntable. Accordingly, the center disc may not be removed accidentally because the toe surfaces establish retention of the center disc 13 relative to the turntable 12. The resiliency of the legs 27–29 and their integral mounting on the disc 13 is a mounting means for the toes 37 which establishes relative resiliency between the toes and the turntable along the length of each foot so that the disc 13 and the turntable 12 may be relatively assembled. The cooperation of the legs with the slots permits the center disc 13 to be readily moved in a direction with an axial component between the upper and lower elevations, yet the disc 13 is definitely attached to the turntable 12. This is accomplished without any parts other than the center disc and turntable themselves, and yet should a center disc become damaged in the field, it may be readily removed by pinching the legs together from the underside of the turntable. A new center disc may then be easily installed.

The FIGURE 7 shows that in the upper elevation of the center disc 13 the toe surfaces 38 are spaced from the bottom of the studs 21–23 sufficiently to accommodate the thickness of the turntable 12. Also the bottom of the studs 21–23 establish a plane normal to the axis 24 and the toe surfaces 38 also establish a plane normal to this axis.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a phonograph turntable having a record supporting surface and an axis of rotation, a movable center disc having an outer surface to be received in a record, means cooperating between said center disc and said turntable to establish a lower and an upper elevation of said disc relative to said turntable, leg means extending from said center disc in a direction having an axial component, integral foot means near the distal end of said leg means, a latching surface of said turntable generally opposite said record supporting surface, integral toe means on said foot means having a toe surface adapted to engage said latching surface, the mounting of said toe means relative to said turntable providing relative resiliency therebetween along the longitudinal dimension of said foot means, and means acting between said toe means and said turntable latching surface to permit movement of the disc in a direction having an axial component toward said record supporting surface, whereby said disc may be moved to said lower and upper elevations relative to said turntable and said toe surface establishes retention of said center disc relative to said turntable.

2. In combination, a phonograph turntable having a record supporting surface and an axis of rotation, a movable center disc having an outer surface to be received in a record, first surface means cooperating between said center disc and said turntable to establish a lower elevation of said disc relative to said turntable, second surface means cooperating between said center disc and said turntable to establish an upper elevation of said center disc relative to said turntable, leg means extending from said center disc in a direction having an axial component, integral foot means near the distal end of said leg means, integral toe means on said foot means having a toe surface adapted to engage a latching surface of said turntable generally opposite said record supporting surface the mounting of said toe means relative to said turntable providing relative resiliency therebetween along the longitudinal dimension of said foot means, and cam surface means acting between a bottom surface of said toe means and the turntable latching surface to relatively cammingly move said toe means and said turntable latching surface in a direction parallel to said foot means longitudinal dimension as said foot means is moved generally axially past said latching surface, whereby said disc may be moved to said lower and upper elevations relative to said turntable and said toe surface establishes retention of said center disc relative to said turntable.

3. In combination, a phonograph turntable having a record supporting surface, a movable center disc having an outer surface to be received in a record, first surface means cooperating between said center disc and said turntable to establish a lower elevation of said disc relative to said turntable, second surface means cooperating between said center disc and said turntable to establish an upper elevation of said center disc relative to said turntable, surfaces in said turntable defining slot means extending through said turntable, leg means extending from said center disc through said slot means, an integral foot near the distal end of a plurality of said leg means, an integral toe on said foot having a toe surface adapted to engage a surface of said turntable generally opposite said supporting surface, the mounting of said toe relative to said turntable providing relative resiliency therebetween along the length of said toe, and cam surface means acting between a bottom surface of said toe and the surface of said turntable adjacent said slot means to relatively cammingly move said toe and said turntable in a direction with a radial component as each foot is passed through the respective one of said slot means, whereby said leg means may be moved in the respective slot means to accommodate said lower and upper elevations of said disc relative to said turntable and said toe surfaces establish retention of said center disc relative to said turntable.

4. In combination, a phonograph turntable having a record supporting surface, surfaces in said turntable defining slot means extending through said turntable, a movable center disc having an outer surface to be received in a record, first surface means cooperating between said center disc and said turntable to establish a lower elevation of said disc relative to said turntable, second surface means cooperating between said center disc and said turntable to establish an upper elevation of said center disc relative to said turntable, leg means depending from said center disc, said leg means extending downwardly through said slot means, an integral foot on the bottom of each of said leg means, the length of said foot being less than the dimension of said slot in a direction parallel to said foot, an integral toe on said foot having a toe surface underlying a part of the turntable and adapted to engage the underside of said turntable, the mounting of said toe relative to said turntable providing relative resiliency therebetween along the length of said foot, cam surface means acting between the bottom of said toe and the surface of said turntable adjacent said slot means to relatively cammingly move said toe and said turntable in a direction parallel to said foot as each foot is passed downwardly through the respective one of said slot means, and said second surface means defining a plane spaced from the plane defined by said toe surfaces an amount greater than the thickness of said turntable, whereby said leg means may be moved in the respective slot means to accommodate said lower and upper elevations of said disc relative to said turntable and said toe surfaces establish retention of said center disc relative to said turntable.

5. In combination, a phonograph turntable having a record supporting surface, surfaces in said turntable defining slot means extending through said turntable, a movable center disc having an outer surface to be received in a record, first surface means cooperating between said center disc and said turntable to establish a lower elevation of said disc relative to said turntable, second surface means cooperating between said center disc and said turntable to establish an upper elevation of said center disc relative to said turntable, leg means perpendicularly depending from said center disc, said leg means extending downwardly through said slot means, an integral foot on the bottom of each of said leg means, the length of said foot being less than a dimension of said slot in a direction parallel to said foot, an integral toe on said foot having a toe surface underlying a part of the turntable and adapted to engage the underside of said turntable, the mounting of said toe relative to said center disc providing resiliency along the length of said foot, a sloping surface on the bottom of each toe to aid in the resilient camming of each toe in a direction parallel to said foot against the inherent resiliency of the mounting as each foot is passed downwardly through the respective one of said slot means, and said second surface means defining a plane spaced from the plane defined by said toe surfaces an amount greater than the thickness of said turntable, whereby said leg means may be moved in the respective slot means to accommodate said lower and upper elevations of said disc relative to said turntable and said toe surfaces establish retention of said center disc relative to said turntable.

6. In combination, a phonograph turntable having a record supporting surface and having an axis of rotation, surfaces in said turntable defining slot means extending through said turntable, a movable center disc having a maximum outside diameter to be received in a record, first surface means on the underside of said center disc adapted to be supported relative to said turntable to establish a lower elevation of said disc relative to said turntable, second surface means on the underside of said disc adapted to be supported relative to said turntable to establish an upper elevation of said center disc relative to said turntable, spring leg means perpendicularly depending from said center disc at substantially equally spaced intervals flush with one of an inner and an outer surface of said disc at the point of attachment, said leg means extending downwardly through said slot means, an integral foot on the bottom of each of said leg means extending beyond the limits of the respective slot means and underlying a part of said turntable, the length of said foot being less than a dimension of said slot in a direction parallel to said foot, a sloping surface on the bottom of each foot to aid in the camming of each leg means in a direction parallel to said foot against the inherent resiliency of the leg means as each foot is passed downwardly through the respective one of said slot means, a toe surface on the top of that part of each foot underlying a part of the turntable and adapted to engage the underside of said turntable, and said second surface means defining a plane spaced from the plane defined by said toe surfaces an amount greater than the thickness of said turntable, whereby said leg means may be moved in the respective slot means to accommodate said lower and upper elevations of said disc relative to said turntable and said toe surfaces establish retention of said center disc relative to said turntable.

7. In combination, a phonograph turntable having a record supporting surface and having an axis of rotation, surfaces in said turntable defining slot means extending through said turntable, a movable center disc having a maximum outside diameter to be received in a record, first surface means on the underside of said center disc adapted to be supported on said turntable to establish a lower elevation of said disc relative to said turntable, spring leg means perpendicularly depending from said center disc at substantially equally spaced intervals flush with one of an inner and an outer surface of said disc at the point of attachment, second surface means on the underside of said disc adapted to be supported on said turntable to establish an upper elevation of said center disc relative to said turntable, said leg means extending downwardly through said slot means, an integral foot on the bottom of each of said leg means extending transversely of the respective slot means and underlying a part of said turntable, a sloping surface on the bottom of each foot to aid in the camming of each leg means transversely of the respective slot means against the inherent resiliency thereof as each foot is passed downwardly through the respective one of said slot means, a toe surface on the top of each foot and adapted to engage the underside of said turntable, said second surface means defining a plane spaced from the plane defined by said toe surfaces an amount slightly greater than the thickness of said turntable, whereby said center disc may be moved in a first direction to have said leg means at one end of the respective slot means with said center disc first surface means resting on said turntable, and whereby said center disc may be moved in the opposite direction and lifted to have said leg means at the other end of the respective slot means with said center disc second surface means resting on said turntable.

8. In combination, a phonograph turntable having a record supporting surface and having an axis of rotation, surfaces in said turntable defining slot means extending through said turntable, a movable center disc having a maximum outside diameter to be received in a record, first surface means on the underside of said center disc adapted to be supported on said turntable to establish a lower elevation of said disc relative to said turntable, spring leg means perpendicularly depending from said center disc at substantially equally spaced intervals flush with an outer surface of said disc at the point of attachment, second surface means on the underside of said disc adapted to be supported on said turntable to establish an upper elevation of said center disc relative to said turntable, said leg means extending downwardly through said slot means, a foot on the bottom of each of said leg means extending radially beyond the radial limits of the respective leg means, a sloping surface on the bottom of each foot to aid in the camming radially of each leg means against the inherent resiliency thereof as each foot is passed downwardly through the respective one of said slot means, a toe surface on the top of each foot and adapted to engage the underside of said turntable, said second surface means defining a plane spaced from the plane defined by said toe surfaces an amount slightly greater than the thickness of said turntable, whereby said center disc may be rotated in a first direction to have said leg means at one end of the respective slot means with said center disc first surface means resting on said turntable, and whereby said center disc may be rotated in the opposite direction and lifted to have said leg means at the other end of the respective slot means with said center disc second surface means resting on said turntable.

9. In combination, a phonograph turntable having a record supporting surface and having an axis of rotation, a depressed portion in said turntable, surfaces in said turntable depressed portion defining slot means extending through said turntable, a movable center disc having a maximum outside diameter to be received in a record, first surface means on the underside of said center disc adapted to cooperate with said turntable depressed portion to establish a lower elevation of said disc relative to said turntable, spring leg means perpendicularly depending from said center disc at equally spaced intervals flush with a radial surface of said disc at the point of attachment, at least first, second and third surfaces defining second surface means on the underside of said center disc at equally spaced intervals to cooperate with said turntable depressed portion to establish an upper elevation of said disc relative to said turntable, said leg means extending downwardly through said slot means, a foot on the bottom of each of said leg means extending radially beyond the radial limits of the respective leg means, a sloping surface on the bottom of each foot to aid in the camming of each leg means against the inherent resiliency thereof as each foot is passed downwardly through the respective one of said slot means, a toe surface on the top of each foot and adapted to engage the underside of said turntable depressed portion, said second surface means defining a plane spaced from the plane defined by said toe surfaces an amount slightly greater than the thickness of said turntable depressed portion, whereby said center disc may be rotated in a first direction to have said leg means at one end of the respective slot means with said center disc first surface means resting on the upper surface of said turntable depressed portion, and whereby said center disc may be rotated in the opposite direction and lifted to have said leg means at the other end of the respective slot means with said center disc second surface means resting on the upper surface of said turntable depressed portion.

10. In combination, a phonograph turntable having a record supporting surface and having an axis of rotation, a depressed portion in said turntable, surfaces in said turntable depressed portion defining slot means extending through said turntable, a movable center disc having a maximum outside diameter to be received in a record, first lower surface means on said center disc adapted to rest on said turntable depressed portion to establish a lower elevation of said disc relative to said turntable, spring leg means perpendicularly depending from said center disc at equally spaced intervals flush with the outer diameter of said disc at the point of attachment, first, second and third studs perpendicularly depending from said center disc at equally spaced intervals, said leg means extending downwardly through said slot means, a foot on the bottom of each of said leg means extending radially outward beyond the radial limits of the respective leg means, an inwardly and downwardly sloping surface on the bottom of each foot to aid in the camming radially inwardly of each leg means against the inherent resiliency thereof as each foot is passed downwardly through the respective one of said slot means, a toe surface on the top of each foot and adapted to engage the underside of said turntable depressed portion, the bottom of each of said studs defining second lower surface means on said center disc adapted to rest on said turntable depressed portion to establish an upper elevation of said disc relative to said turntable, said second surface means defining a plane spaced from the plane defined by said toe surfaces an amount slightly greater than the thickness of said turntable depressed portion, whereby said center disc may be rotated in a first direction to have said leg means at one end of the respective slot means and to have said studs received in said slot means with said center disc first surface means resting on the upper surface of said turntable depressed portion, and whereby said center disc may be rotated in the opposite direction and lifted to have said leg means at the other end of the respective slot means with said outer disc second surface means on the bottom of said studs resting on the upper surface of said turntable depressed portion.

11. In combination, a phonograph turntable having a record supporting surface and having an axis of rotation, a depressed portion in said turntable, surfaces in said turntable depressed portion defining slot means including three equally spaced equal radius coaxial slots, a movable center disc having a maximum outside diameter to be received in a record to center the same on the turntable, a lower surface on said center disc adapted to rest on said turntable depressed portion, spring leg means perpendicularly depending from said center disc at equally spaced intervals flush with the maximum radius of said disc at the point of attachment, first, second and third studs perpendicularly depending from said center disc at equally spaced intervals, said leg means and said studs extending downwardly through said slot means, a foot on the bottom of each of said leg means extending radially outward beyond the radial limits of the respective leg means, an inwardly and downwardly sloping surface on the bottom of each foot to aid in the camming radially inwardly of each leg means against the inherent resiliency thereof as each foot is passed downwardly through the respective one of said slot means, a flat surface substantially normal to said axis on the top of each foot and adapted to engage the underside of said turntable depressed portion, the bottom of each of said studs adapted to rest on the upper surface of said turntable depressed portion and together defining a plane spaced from the plane defined by said feet upper surfaces an amount slightly greater than the thickness of said turntable depressed portion, whereby said center disc may be rotated in a first direction to have said leg means at one end of the respective slot means and to have said studs received in said slot means with said center disc lower surface resting on the upper surface of said turntable depressed portion, and whereby said center disc may be rotated in the opposite direction and lifted to have said leg means at the other end of the respective slot means and to have the bottom of said studs resting on the upper surface of said turntable depressed portion.

12. In combination, a phonograph turntable having a record supporting surface and having an axis of rotation, a depressed portion in said turntable, three equally spaced equal radius coaxial slots in said turntable depressed portion, a movable center disc having a maximum outside diameter to be received in a record, a lower surface on said center disc adapted to rest on said turntable depressed portion, first, second and third spring legs perpendicularly depending from said center disc at equally spaced intervals flush with the outer diameter of said disc, first, second and third studs perpendicularly depending from said center disc at equally spaced intervals, said first, second and third legs being adjacent said first, second and third studs, respectively, with each adjacent pair extending downwardly through one of said slots, a foot on the bottom of each leg extending radially outward beyond the radial limits of said disc, a cam surface on the bottom of each foot to aid in the camming radially inwardly of each leg against the inherent resiliency thereof as each leg is passed downwardly through the respective slot, a flat surface substantially normal to said axis on the top of each foot and adapted to engage the underside of said turntable depressed portion, the bottom of each of said studs adapted to rest on the upper surface of said turntable depressed portion and together defining a plane spaced from the plane defined by said feet upper surfaces an amount slightly greater than the thickness of said turntable depressed portion, whereby said center disc may be rotated in a first direction to have said legs at one end of the respective slots and to have said studs received in said slots with said center disc lower surface resting on the upper surface of said turntable depressed portion, and whereby said center disc may be rotated in the opposite direction and lifted to have said legs at the other end of the respective slots and to have the bottom of said studs resting on the upper surface of said turntable depressed portion.

13. In combination, a phonograph turntable having a record supporting surface and having an axis of rotation, a depressed portion in said turntable, surfaces in said turntable depressed portion defining three equally spaced equal radius coaxial slots, a movable center disc having a maximum outside diameter to be received in a record, a lower surface on said center disc adapted to rest on said turntable depressed portion, first, second and third spring legs perpendicularly depending from said center disc at equally spaced intervals flush with the outer diameter of said disc, first, second and third studs perpendicularly depending from said center disc at equally spaced intervals flush with the outer diameter of said disc, said first, second and third legs being adjacent said first, second and third studs, respectively, with each adjacent pair extending downwardly through one of said slots, a foot on the bottom of each leg extending radially outward beyond the radial limits of said disc, an inwardly and downwardly sloping surface on the bottom of each foot to aid in the camming radially of each leg against the inherent resiliency thereof as each leg is passed downwardly through the respective slot, a flat surface substantially normal to said axis on the top of each foot and adapted to engage the underside of said turntable depressed portion, the bottom of each of said studs adapted to rest on the upper surface of said turntable depressed portion and together defining a plane spaced from the plane defined by said feet upper surfaces an amount slightly greater than the thickness of said turntable depressed portion, whereby said center disc may be rotated in a first direction to have said legs at one end of the respective slots and to have said studs received in said slots with said center disc lower surface resting on the upper surface of said turntable depressed portion, and whereby said center disc may be rotated in the opposite direction and lifted to have said legs at the other end of the respective slots and to have the bottom of said studs resting on the upper surface of said turntable depressed portion.

14. In combination, a phonograph turntable having a record supporting surface and having an axis of rotation, a depressed portion in said turntable having a given maximum radius, surfaces in said turntable depressed portion defining three equally spaced equal radius coaxial slots, a movable center disc having a maximum outside diameter to be received in 45 r.p.m. records, a depending rim on said center disc flush with the outer diameter thereof and defining a planar surface to rest on the upper surface of said turntable depressed portion, first, second and third spring legs integral with and perpendicularly depending from said center disc rim at equally spaced intervals flush with the outer diameter of said disc, first, second and third studs integral with and perpendicularly depending from the rim of said center disc at equally spaced intervals flush with the outer diameter of said disc, said first, second and third legs being adjacent said first, second and third studs, respectively, with each adjacent pair extending downwardly through one of said slots, a foot on the bottom of each leg extending radially outward beyond the maximum outside diameter of said disc, an inwardly and downwardly sloping surface on the bottom of each foot to aid in the camming radially inwardly of each leg against the inherent resiliency thereof as each leg is passed downwardly through the respective slot, a flat surface substantially normal to said axis on the top of each foot and adapted to engage the underside of said turntable depressed portion, the bottom of each of said studs adapted to rest on the upper surface of said turntable depressed portion and together defining a plane spaced from the plane defined by said feet upper surfaces an amount slightly greater than the thickness of said turntable depressed portion, whereby said center disc may be rotated in a first direction to have said legs at one end of the respective slots and to have said studs received in said slots with said rim resting on the upper surface of said turntable depressed portion, and whereby said center disc may be rotated in the opposite direction and lifted to have said legs at the other end of the respective slots and to have the bottom of said studs resting on the upper surface of said turntable depressed portion.

15. In combination, a phonograph turntable having a record supporting planar surface and having an axis of rotation, a depressed circular portion in said turntable of a given radius, surfaces in said turntable depressed portion defining three equally spaced equal radius coaxial slots, each slot subtending substantially 30 degrees of arc, a movable circular center disc having an outside diameter to be received in 45 r.p.m. records, a depending rim on said center disc flush with the outer diameter thereof and defining a planar surface to rest on the upper surface of said turntable depressed portion, first, second and third spring legs integral with and perpendicularly depending from said center disc rim at equally spaced intervals flush with the outer diameter of said disc, first, second and third studs integral with and perpendicularly depending from the rim of said center disc at equally spaced intervals flush with the outer diameter of said disc, said first, second and third legs being adjacent said first, second and third studs, respectively, with each adjacent pair subtending an angle of approximately 25° and extending downwardly through one of said slots, a foot on the bottom of each leg extending radially outward beyond the radial limits of said disc, an inwardly and downwardly sloping surface on the bottom of each foot to aid in the camming radially inwardly of each leg against the inherent resiliency thereof as each leg is passed downwardly through the respective slot, a flat surface substantially normal to said axis on the top of each foot and adapted to engage the underside of said turntable depressed portion radially outwardly from the respective slot, the bottom of each of said studs adapted to rest on the upper surface of said turntable depressed portion and together defining a plane spaced from the plane defined by said feet upper surfaces an amount slightly greater than the thickness of said turntable depressed portion, whereby said center disc may be rotated in a first direction to have said legs at one end of the respective slots and to have said studs received in said slots with said rim resting on the upper surface of said turntable depressed portion, and whereby said center disc may be rotated in the opposite direction and litted to have said legs at the other end of the respective slots and to have the bottom of said studs resting on the upper surface of said turntable depressed portion.

16. In combination, a phonograph turntable having a record supporting surface and an axis of rotation, a movable center disc having an outer surface to be received in a record, first surface means cooperating between said center disc and said turntable to establish a lower elevation of said disc relative to said turntable, second surface means cooperating between said center disc and said turntable to establish an upper elevation of said center disc relative to said turntable, leg means extending from said center disc in a direction having an axial component, foot means near the distal end of said leg means, latching surface means of said turntable generally opposite said record supporting surface and establishing a latching surface plane, toe means on said foot means having a toe surface adapted to underlie said latching surface plane, and resilient means having resiliency relative to said turntable along the longitudinal dimension of said foot means, said resilient means permitting assembly of said center disc and said turntable to establish said toe means in a position underlying said latching surface plane, and said resilient means establishing retention of said center disc relative to said turntable by coaction between said toe means and said latching surface means in an axial direction yet said disc may be moved to said upper and lower elevations relative to said turntable.

References Cited in the file of this patent

UNITED STATES PATENTS 2,799,509 Thomas ---------------- July 16, 1957